C. W. DONHOLT.
FAUCET.
APPLICATION FILED MAR. 3, 1910.

998,282.

Patented July 18, 1911.

Inventor
C. W. Donholt,

Witnesses

By Woodward & Chandlee
Attorneys

UNITED STATES PATENT OFFICE.

CHARLES W. DONHOLT, OF RIDGEWOOD, NEW JERSEY.

FAUCET.

998,282.      Specification of Letters Patent.      Patented July 18, 1911.

Application filed March 3, 1910. Serial No. 547,084.

*To all whom it may concern:*

Be it known that I, CHARLES W. DONHOLT, a citizen of the United States, residing at Ridgewood, in the county of Bergen and State of New Jersey, have invented certain new and useful Improvements in Faucets, of which the following is a specification.

This invention relates to faucets, and more particularly to a device of this character fixed with an operating stem provided with screw threads adapted for engagement with a correspondingly screw threaded body portion on the faucet, said latter threads being arranged interiorly of said body portion. In devices of this character heretofore patented, it has been usually the case, that the screw threads formed on the spindle and the interior of the body portion of the faucet were easily worn out and mutilated by chips or other sediment, which became lodged between the screw threads. This necessitated the renewal of the faucet or the provision of such packing as would only prevent leaking of the device for a short space of time. Furthermore, the operation of the spindle within the sleeve became very stiff, so that said spindle could only be rotated by a jerky motion and the bearing part of the spindle and sleeve would withstand only a small amount of wear. To obviate these objectionable features, I provide the spindle and the interior of the sleeve with threads having a circular contour so that said parts will be relatively movable with grace and ease, as well as preventing the access of any material therebetween, which would mutilate or otherwise destroy the threads.

It is a further object to provide a device of this character in which the bearing parts shall be nearly all of metal, so that such packing as leather or the like shall not be disposed for contact with the water under pressure.

Another object is to construct a device of this character in which the same shall be composed of a relatively few number of parts, thereby rendering the same easy of assemblage as well as economical to manufacture.

A further object is to provide a spindle valve construction composed of integral parts so that the same will not be liable to become loose or otherwise destroyed by the constant pressure of water thereon.

Other objects and advantages will be apparent from the following description and it will be understood that changes in the specific structure shown and described may be made within the scope of the claims without departing from the spirit of the invention.

Figure 1:
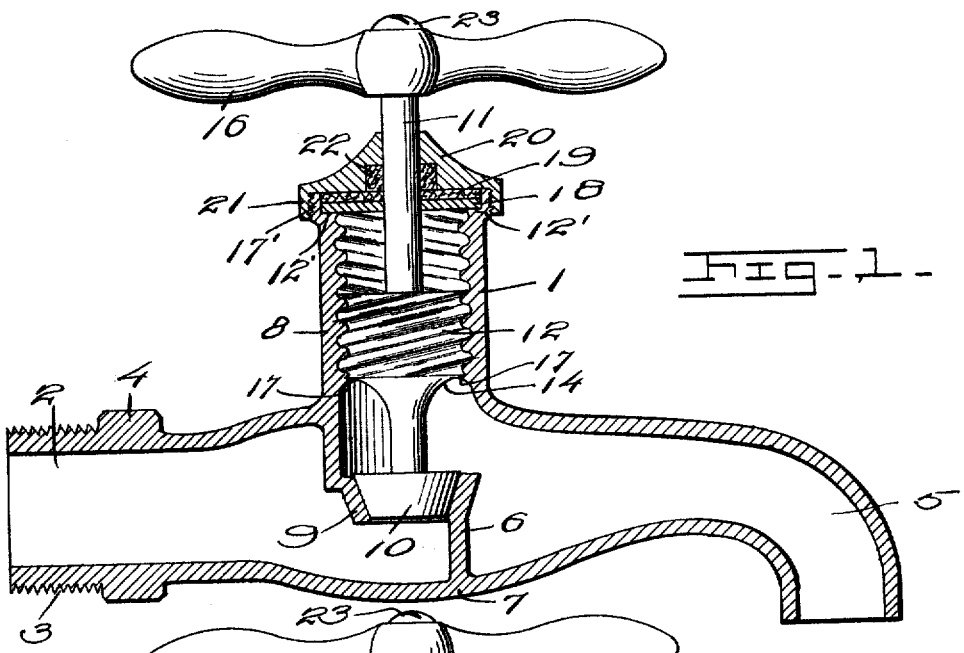
Figure 2:
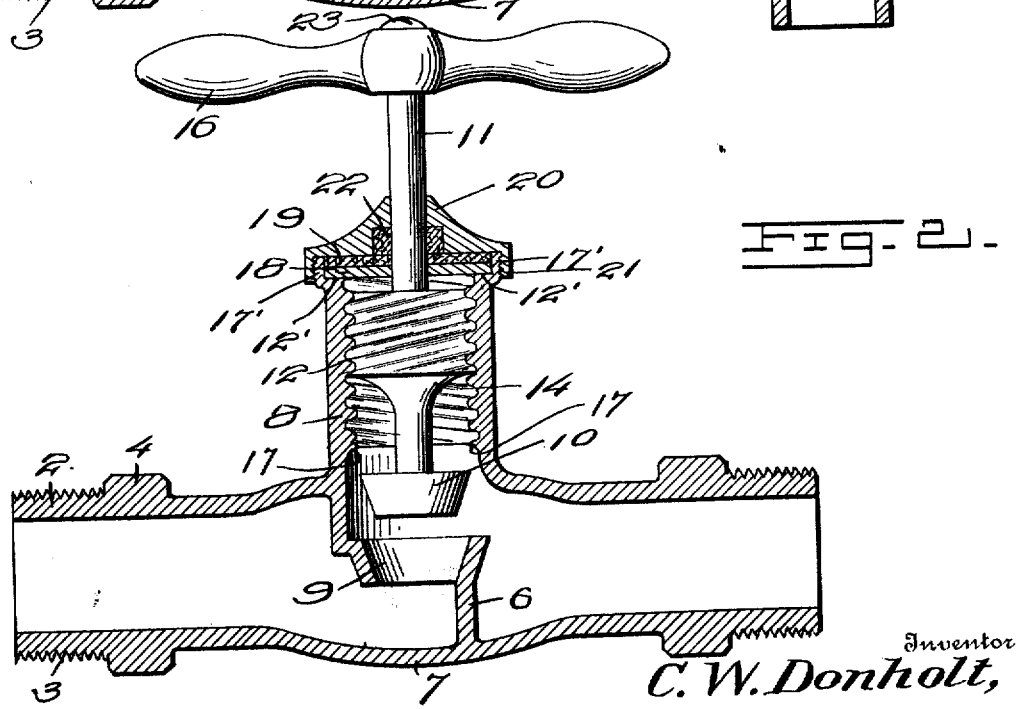

In the drawings: Figure 1 is a vertical sectional view of my faucet, showing the same in its closed position. Fig. 2 is a similar view of a straightway valve, but showing the faucet in an open position, and the valve and valve seat out of engagement.

Referring to the drawings, the numeral 1 designates the body or extension of the faucet, which is provided with the usual inlet pipe 2, having exterior screw threads 3 thereon for attachment to a service pipe or the like, said inlet portion 2 being also provided with an enlarged portion 4, which may be rectangular or of other shape, so as to readily effect such attachment. The body of the faucet is further provided with the usual discharge portion 5, which may be extended downwardly so as to discharge the fluid in such direction or outwardly in alinement with the receiving or inlet pipe 2, this, however, is an immaterial point which is well known in the art.

The faucet is provided with the usual partition 6, the lower portion of which extends upwardly from the concaved or dished under portion 7 of the faucet and in alinement with the front portion of the upward extension of the faucet and the upper portion thereof extends downwardly in direct alinement with the rearward portion 8 of said extension and said partition wall is provided with a conical valve seat 9, disposed to receive water from the inlet pipe 2 and discharge the same therethrough. Adapted to engage the interior wall of said valve seat is the valve head 10, which is also conical in shape, said valve head being provided for snug engagement with the valve seat so that any wear thereon will be evenly communicated to both parts and a water tight joint will always be formed thereby. Said valve head is preferably formed integral with the valve stem 11, said valve stem being further provided with an integral central enlarged portion 12 having a concaved under surface 14, so that any material or water may be prevented from lodgment between the screw threads on the enlarged portion of the spindle and the interior of the extension, and thus prevent mutilation thereof. The said threads on the enlarged portion and the interior surface of the extension are cut circular in contour, so that the same will be readily movable and only a few short turns of the operating handle 16 will be necessary in order to open and close the faucet.

The interior of the extension is provided with a circumferential lip 17 adapted to coact with the corresponding circumferential face of the lower dished portion of the enlarged central portion 12 of the spindle when in a closed position, as shown in Fig. 1 of the drawings. It will be seen that by providing this construction, sediment or other material in the water cannot become lodged between the enlarged portion 12 and the interior of the extension 1 and said material will be absolutely deflected from said face through the discharge opening or nozzle 5.

The upper portion of the body 1 is provided with an enlarged portion 17' forming an interior shoulder 12', the inner face of said enlarged portion being in alinement with the outer face of the body portion 1, said shoulder forming a seat for the packing shown as washers 18 and 19, the former of which is more especially of brass material, and the latter of which may be of rubber or canvas, this packing being adapted to be tightly forced against said shoulder by means of a screw cap 20, said cap being conical in shape and provided with a downwardly extending flange 21 which is screw threaded for engagement with the corresponding screw threaded portion of the enlarged portion 17', for forcing said packing in such position. The under face of the cap is hollowed out or recessed interiorly and adapted for the reception of a suitable composition packing or the like 22, to prevent the escape of the water between the coacting faces of the spindle and the cap, which has been a very objectionable feature in other devices of this character. The operating handle 16 is provided with the usual screw 23, received in the spindle and adapted to secure said handle thereon, as is well known in the art.

It will be seen that I have provided a faucet, which is very simple in construction and composed of a relatively few number of parts. This is a very necessary feature in the construction of these devices which are under the pressure of the water from the main. It will also be seen that by making the upper portion of the enlarged portion 12 extended at right angles with respect to the spindle 11, when said enlarged portion is in its uppermost position, the packing disposed against the cap 20, will be compressed evenly thereagainst.

What is claimed is:

1. A faucet comprising a casing having inlet and outlet ports, said casing being formed with an interiorly threaded extension and having a concaved lip at the lower end of the threaded portion, a partition wall formed with the casing and extension the upper portion of which extends downwardly from the wall of the casing in alinement with the rear portion of the extension at the inlet side and provided with an inwardly directed lower end, and the lower portion of which extends upwardly, from the bottom of the casing and formed with an outwardly flared upper portion in alinement with the front portion of the extension at the outlet side and coacting with said inwardly directed lower end to form a conical valve seat, a cap closing the upper end of the extension and an operating stem having an integral screw threaded head working in the extension, said head having a concaved under surface tapering to form the valve stem proper and coacting with said concaved lip and a conical head at the lower end of the valve stem integral therewith adapted to coact with the conical valve seat.

2. In a faucet, the combination with a casing having an inlet and an outlet portion; of a vertical extension formed with the casing, a partition wall forming a valve seat beneath the extension, said extension having rounded interior threads and an enlarged exteriorly threaded upper end having an interior recess, the wall of which is in alinement with the outer face of the extension to form a shoulder, a cap having an interiorly threaded flange engaging the exterior threads of the enlarged portion and having a central interior recess, a metallic washer resting in contact with the shoulder, a resilient washer resting upon the metallic washer, a composition packing in the inner recess of the cap and a spindle provided with an enlarged portion having rounded exterior threads engaging the interior threads of the extension and a valve head adapted to coact with the seat.

In testimony whereof I affix my signature, in presence of two witnesses.

CHARLES W. DONHOLT.

Witnesses:
ADAM PENNAL,
JOSEPH B. HOULIHAN.

Copies of this patent may be obtained for five cents each, by addressing the "Commissioner of Patents, Washington, D. C."